US011556558B2

(12) United States Patent
Kabra et al.

(10) Patent No.: US 11,556,558 B2
(45) Date of Patent: Jan. 17, 2023

(54) INSIGHT EXPANSION IN SMART DATA RETENTION SYSTEMS

(71) Applicant: International Business Machines Corporation, Armonk, NY (US)

(72) Inventors: Namit Kabra, Hyderabad (IN); Ritesh Kumar Gupta, Hyderabad (IN); Ron Reuben, San Ramon, CA (US); Vijay Ekambaram, Chennai (IN); Smitkumar Narotambhai Marvaniya, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 15 days.

(21) Appl. No.: 17/145,458

(22) Filed: Jan. 11, 2021

(65) Prior Publication Data
US 2022/0222265 A1   Jul. 14, 2022

(51) Int. Cl.
| | |
|---|---|
| *G06F 16/25* | (2019.01) |
| *G06F 16/23* | (2019.01) |
| *G06N 20/00* | (2019.01) |
| *G06F 16/215* | (2019.01) |
| *G06F 16/951* | (2019.01) |

(52) U.S. Cl.
CPC ......... *G06F 16/254* (2019.01); *G06F 16/215* (2019.01); *G06F 16/2365* (2019.01); *G06F 16/951* (2019.01); *G06N 20/00* (2019.01)

(58) Field of Classification Search
CPC .............................. G06F 16/2255; G06F 16/215
See application file for complete search history.

(56) References Cited

U.S. PATENT DOCUMENTS

| | | | |
|---|---|---|---|
| 7,685,083 B2 | 3/2010 | Fairweather | |
| 8,868,501 B2 | 10/2014 | Borden et al. | |
| 9,535,902 B1 * | 1/2017 | Michalak | ............ G06F 16/3331 |
| | (Continued) | | |

FOREIGN PATENT DOCUMENTS

WO    2019171328 A1    9/2019

OTHER PUBLICATIONS

"Why you need a data retention policy", Blog, Dec. 20, 2018, Stronghold Data, 8 pages. https://www.strongholddata.com/why-you-need-a-data-retention-policy/.

(Continued)

*Primary Examiner* — Grace Park
(74) *Attorney, Agent, or Firm* — Daniel M. Yeates

(57) ABSTRACT

A computer-implemented method applies insights from a variety of data sources to each of the data sources. The method includes identifying a set of data sources, wherein each of the data sources are associated with a domain. The method includes analyzing documentation for each of the data sources. The method further includes extracting a set of attributes for each data source, and determining a data schema associated with each data source. The method includes mapping each data schema to a common domain schema. The method also includes linking, based on the mapping and on the set of attributes for each data source, common features across each data source. The method includes generating, in response to the linking, a knowledge graph. The method further includes preparing a visual display for a set of domain insights; and forking the set of domain insights into a first data source.

19 Claims, 5 Drawing Sheets

(56) References Cited

U.S. PATENT DOCUMENTS

| | | | |
|---|---|---|---|
| 10,264,014 B2 | 4/2019 | Stowe et al. | |
| 2003/0177212 A1* | 9/2003 | Givoly | G06Q 30/02 709/223 |
| 2005/0144158 A1* | 6/2005 | Capper | G06F 16/954 |
| 2007/0011298 A1* | 1/2007 | Givoly | G06Q 30/02 709/223 |
| 2011/0191455 A1* | 8/2011 | Gardner | H04L 63/1441 709/223 |
| 2012/0185445 A1 | 7/2012 | Borden et al. | |
| 2013/0014253 A1* | 1/2013 | Neou | H04L 63/1441 726/22 |
| 2013/0311473 A1* | 11/2013 | Safovich | G06F 16/285 707/738 |
| 2014/0372384 A1 | 12/2014 | Long et al. | |
| 2015/0317337 A1 | 11/2015 | Edgar | |
| 2015/0347480 A1* | 12/2015 | Smart | G06F 16/2237 707/743 |
| 2015/0363270 A1 | 12/2015 | Hammer | |
| 2016/0044054 A1* | 2/2016 | Stiansen | H04L 63/1416 726/24 |
| 2016/0147876 A1* | 5/2016 | Gilbert | G06Q 30/02 707/765 |
| 2018/0082183 A1 | 3/2018 | Hertz et al. | |
| 2018/0191867 A1 | 7/2018 | Siebel et al. | |
| 2018/0357422 A1* | 12/2018 | Telang | G06F 21/577 |
| 2018/0373781 A1 | 12/2018 | Palrecha | |
| 2020/0012738 A1* | 1/2020 | Tung | G06F 16/9024 |
| 2020/0026710 A1 | 1/2020 | Przada et al. | |
| 2020/0396254 A1* | 12/2020 | Crabtree | G06F 16/951 |
| 2022/0059228 A1* | 2/2022 | Chen | G06N 5/02 |

OTHER PUBLICATIONS

Ismail, "The importance of data retention: months not days", Information Age, Apr. 11, 2017, 5 pages. https://www.information-age.com/importance-data-retention-months-not-days-123465662/.

Perucci, "Preparing the Smart Machine Platform and Data Analysis Tools for Tomorrow's Workers", DZone, May 24, 2017, 2 pages. https://dzone.com/articles/preparing-the-smart-machine-platform-and-data-anal-1.

Lavenda, "Data Over-Retention: Why You Don't Need It, and What to Do About It", Martechseries, Nov. 13, 2019, 3 pages. https://martechseries.com/mts-insights/guest-authors/data-retention-dont-need/.

CallMiner, "Smart Implementation of Machine Learning and AI in Data Analysis: 50 Examples, Use Cases and Insights an Leveraging AI and ML in Data Analytics", CallMiner, Jun. 4, 2019, 52 pages. https://callminer.com/blog/smart-implementation-machine-learning-ai-data-analysis-50-examples-use-cases-insights-leveraging-ai-ml-data-analytics/.

Berlin et al. "Database Schema Matching Using Machine Learning with Feature Selection", International Conference on Advanced Information Systems Engineering, 2002, 15 pages.

Mell et al., "The NIST Definition of Cloud Computing", Recommendations of the National Institute of Standards and Technology, Special Publication 800-145, Sep. 2011, 7 pages.

* cited by examiner

INSIGHT EXPANSION IN SMART DATA RETENTION SYSTEMS

BACKGROUND

The present disclosure relates to data management, and, more specifically, to expanding insights in smart data retention systems.

Data storage capacity and/or technology has greatly increased in recent years. This results in an increasing amount of data being collected and stored by an increasing number of parties.

SUMMARY

Disclosed is a computer-implemented method to apply insights from a variety of data sources to each of the data source. The method includes identifying a set of data sources, wherein each of the data sources are associated with a domain. The method also includes analyzing a set of documentation for each of the data sources. The method further includes extracting, based on the analyzing, a set of attributes for each data source. The method includes determining, in response to the extracting, a data schema associated with each data source. The method further includes mapping each data schema to a common domain schema. The method also includes linking, based on the mapping and on the set of attributes for each data source, common features across each data source. The method includes generating, in response to the linking, a knowledge graph. The method further includes preparing a visual display for a set of domain insights; and forking the set of domain insights into a first data source. Further aspects of the present disclosure are directed to computer program products containing functionality consistent with the method described above.

Further aspects of the disclosure include a system to apply insights from a variety of data sources to each of the data source. The system includes a processor. The system further includes a computer-readable storage medium communicatively coupled to the processor and storing program instructions. The system further includes a set of data sources wherein each data source includes a data schema and each data source is included in a domain. The system also includes a sync-adapter, where the sync-adapter is configured to crawl a code base and analyze a set of documentation for each data source, extract semantic descriptions for the data schema, and identify a set of schema features common to each data source in the domain. The system further include a reverse insight adapter. The reverse insight adapter is configured to visualize the set of schema features, build a domain learning model, and fork the domain model to each data source.

The present Summary is not intended to illustrate each aspect of every implementation of, and/or every embodiment of the present disclosure.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Cloud Computing in General

Figure 1:
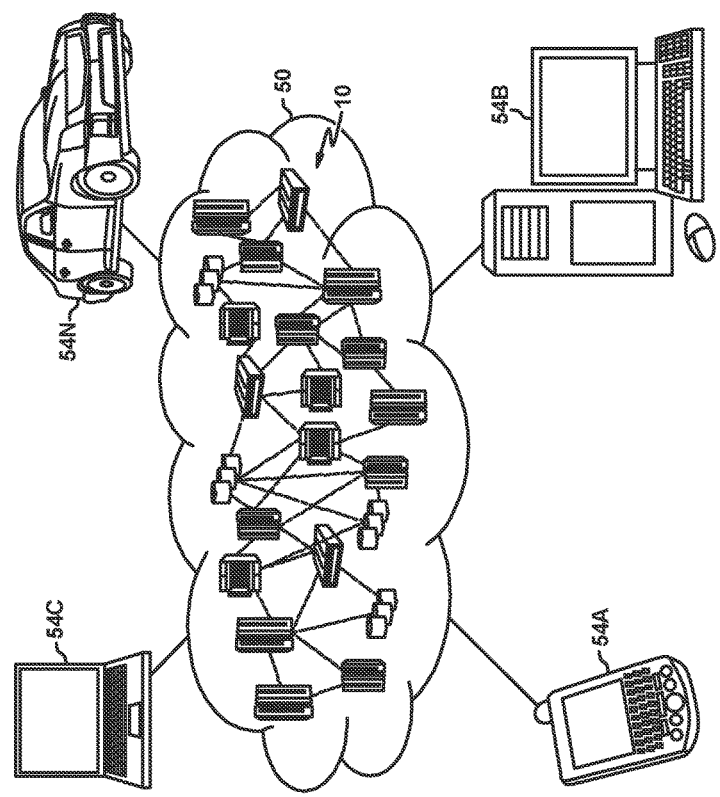
FIG. 1 depicts a cloud computing environment according to embodiments of the present disclosure.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in Figure1 are intended to be illustrative only and that computing nodes 10 and cloud computing environment 50 can communicate with any type of computerized device over any type of network and/or network addressable connection (e.g., using a web browser).

Figure 2:
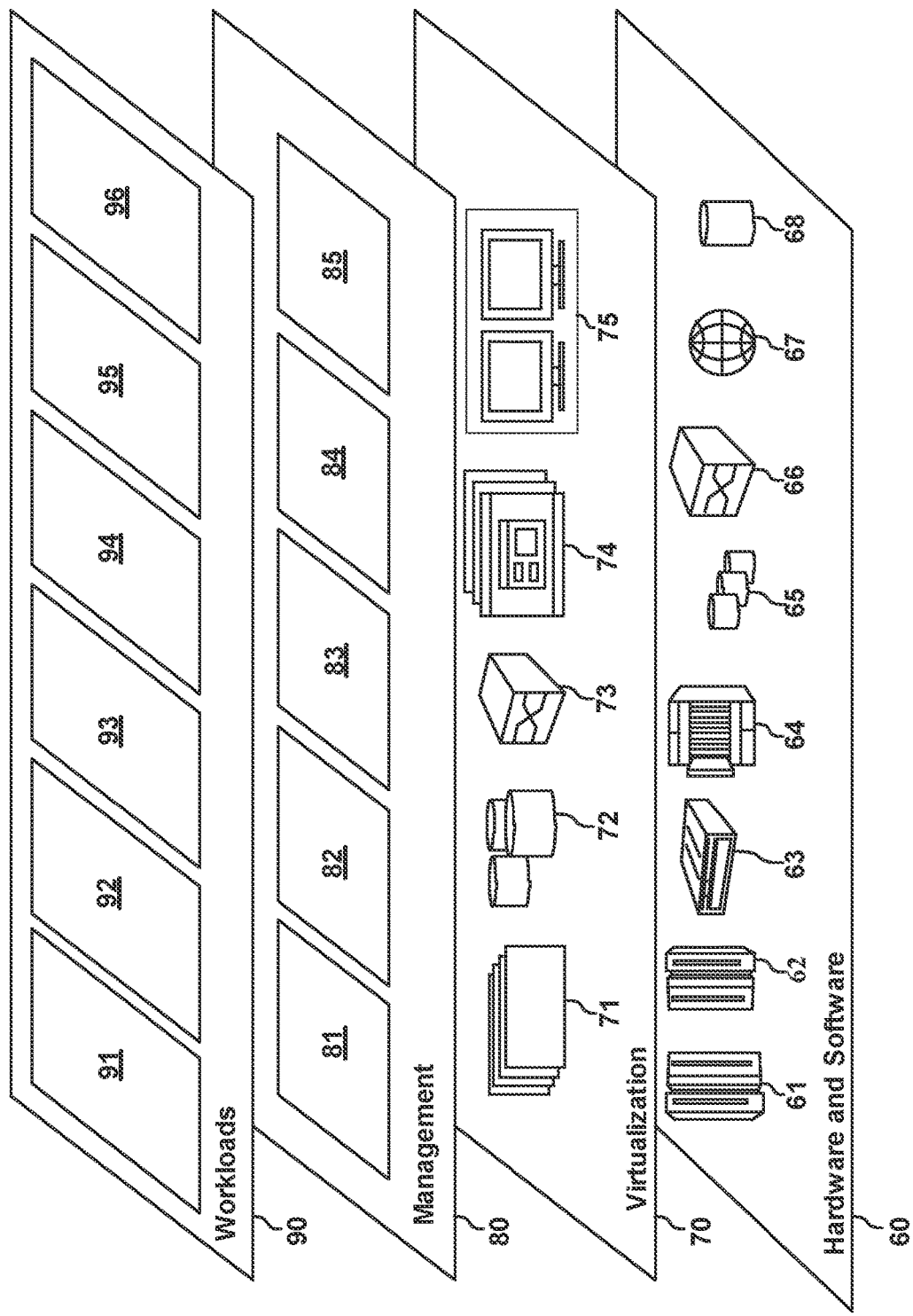
FIG. 2 depicts abstraction model layers according to embodiments of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data pool insight expansion 96.

Data Processing System in General

Figure 3:
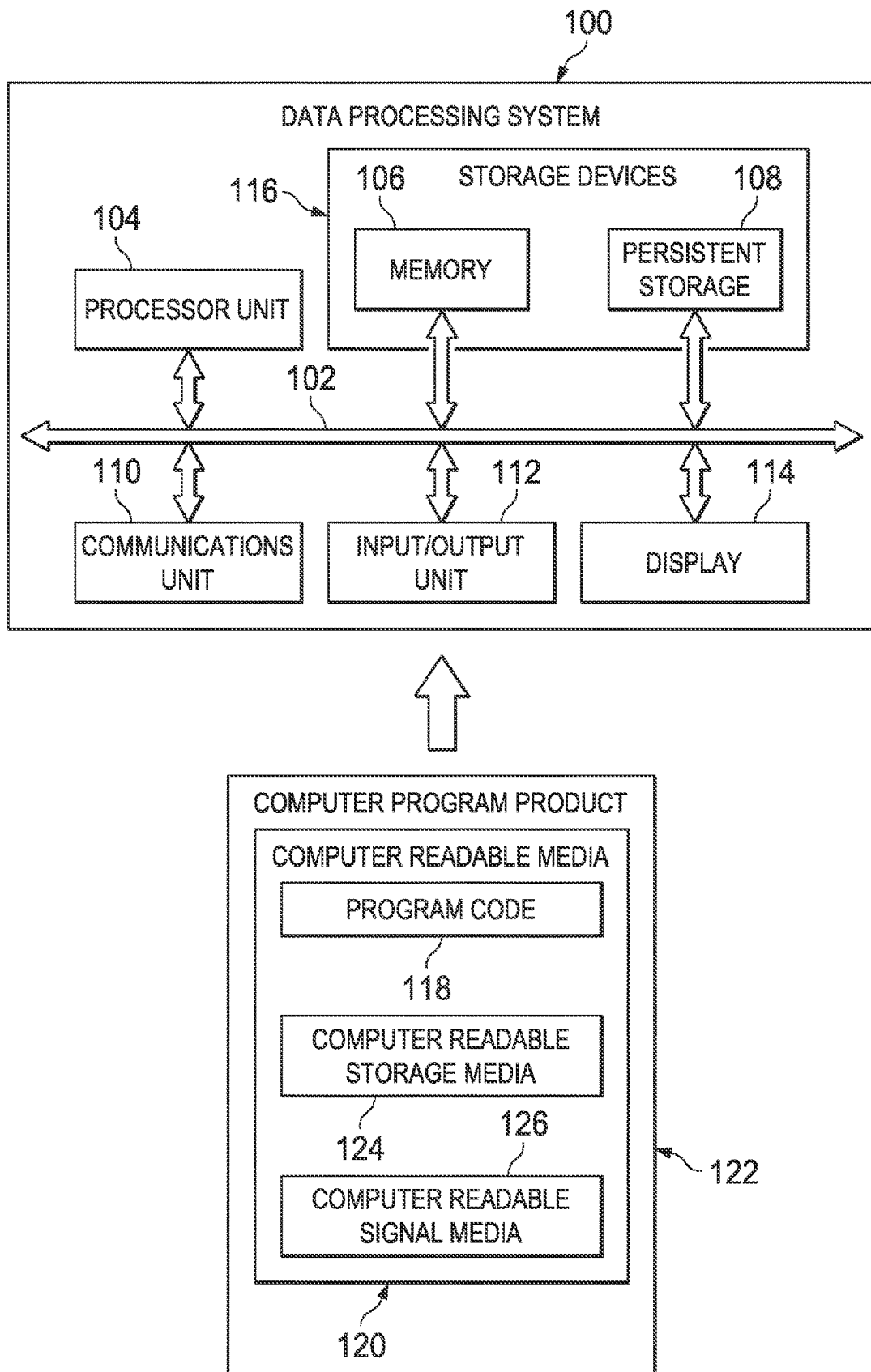
FIG. 3 is a block diagram of a DPS according to embodiments present disclosure.

FIG. 3 is a block diagram of an example DPS according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an I/O unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1

Data Pool Insight Expansion

The present disclosure relates to data management, and, more specifically, to expanding insights in smart data retention systems.

Data storage capacity and/or technology has greatly increased in recent years. This results in an increasing amount of data being collected and stored by an increasing number of parties. The data can be analyzed to generate insights. The insights can be used to further the goals of the data collector. As the amount of data gathered and stored increases, the computing power and time needed to analyze the data increases as well.

Embodiments of the present disclosure can automatically apply insights from one data source or a collection of data sources across multiple data sources. The data sources can be a data lake and/or a database. A database can be storage structure configured to store structured data. A data lake can be a storage structure that can hold relatively large amounts of data in its original form, or unstructured data. Embodiments of the present disclosure allow for more efficient use of computing resources. For example, embodiments of the present disclosure can perform a detailed analysis on a relatively small portion of the data and apply the analysis and insights to the remaining data sources. This can result in reducing the overall computing usage.

Embodiments of the present disclosure include a sync-adapter and a reverse insight adapter. The sync-adapter can be configured to identify various insights across one or more data lakes. For example, the sync-adapters can identify insights, features, and/or characteristics of data lakes, and how the features interact with other features. The sync adapters can also identify, and weight features common across a common domain. The sync-adapter can also identify schema associated with the data lakes. The reverse insight adapter can fork/apply the insight from the sync-adapter to the various data lakes. The reverse insight adapter can generate a learning model that is specific to the data source. The learning model can be configured to better utilize the data in the specific data source.

Embodiments of the present disclosure include a data manager configured to identify common data schema across a variety of data sources. The data manager can identify a number of data sources. In some embodiments, the data manager identifies a schema associated with each of the data sources. In some embodiments, each of the data sources can be associated with a different entity and/or be a from a similar domain. The domain can be anything category where sources can be grouped together. For example, each industry can be a domain (e.g., education, medical, sales, etc.). In some embodiments, the data manager determine schema features. In some embodiments, the data manager can create a network graph. The network graph can represent links and/or weights (e.g., comparison score, etc.) between features of the data sources. In some embodiments, data manager can generate a global analytic feature set (GAFS). The GAFS can be an overall display of the features of the data source. In some embodiments, data manager applies the GAFS to various data sources. In some embodiments, the data manager builds a learning model to leverage the specific data set with each data source.

The aforementioned advantages are example advantages, and embodiments exist that can contain all, some, or none of the aforementioned advantages while remaining within the spirit and scope of the present disclosure.

Figure 4:
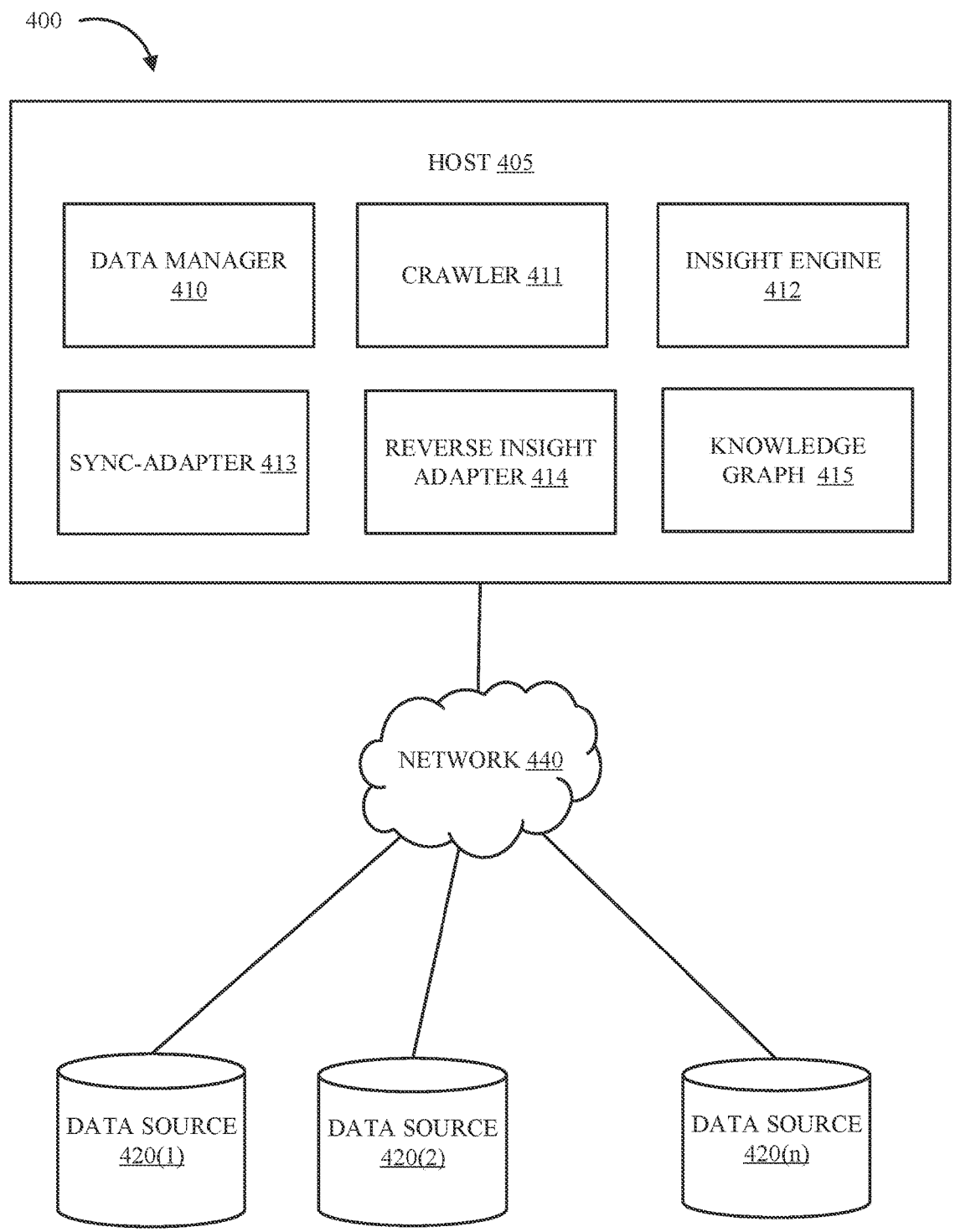
FIG. 4 is a functional diagram of a computing environment suitable for operation of a data manager according to embodiments of the present disclosure.

Referring now to various embodiments of the disclosure in more detail, FIG. 4 is a representation of a computing environment 400, that is capable of running a data manager in accordance with one or more embodiments of the present disclosure. Many modifications to the depicted environment may be made by those skilled in the art without departing from the scope of the disclosure.

Computing environment 400 includes host 405, data source 420 (1), data source 420 (2), data source 420 (n) where n is an integer, and network 440. Data source 420 (1), data source (2), through data source 420 (n) will be referred to as data source 420 collectively, selectively and/or individually. In some embodiments, host 405, and/or data source 420 may include a computer system, such as the data processing system 100. In some embodiments, host 405, and data source 420 are included in the same computing device; however, they are shown as separate for discussion purposes.

Network 440 can be, for example, a telecommunications network, a local area network (LAN), a wide area network (WAN), such as the Internet, or a combination of the three, and can include wired, wireless, or fiber optic connections. Network 440 may include one or more wired and/or wireless networks that are capable of receiving and transmitting data, voice, and/or video signals, including multimedia signals that include voice, data, and video information. In general, network 440 may be any combination of connections and protocols that will support communications between host 405, data source 420, and other computing devices (not shown) within computing environment 400. In some embodiments, network 440 includes 5G capability. 5G is a wireless technology with data transfer speed that can range from about 50 Megabits per second to over a gigabit per second.

Host 405 can be a standalone computing device, a management server, a web server, a mobile computing device, or any other electronic device or computing system (e.g., DPS 100) capable of receiving, sending, and processing data. In other embodiments, host 405 can represent a server computing system utilizing multiple computers as a server system, such as in cloud computing environment 50. In some embodiments, host 405 represents a computing system utilizing clustered computers and components (e.g., database server computers, application server computers, etc.) that act as a single pool of seamless resources when accessed within computing environment 400. In some embodiments, host 405 includes data manager 410, crawler 411, insight engine 412, sync-adapter 413, reverse insight adapter 414, and knowledge graph 415. In some embodiments, one or more of crawler 411, insight engine 412, sync-adapter 413, reverse insight adapter 414, and knowledge graph 415 can be included in data manager 410, and/or as separate computing devices communicatively coupled to host 405 through network 440.

Data manager 410 can be any combination of hardware and/or software configured to identify and share insights between one or more data sources 420. In some embodiments, data manager uses one or more of crawler 411, insight engine 412, sync-adapter 413, and reverse insight adapter 414 to identify one or more insights in a first data source (e.g., data source 420(1)), and then fork (or apply) those insights to one or more other data sources (e.g., data source (420(2)). In some embodiments, the insight can include a method to use the data—for example, a method to further the goals of a data collector (e.g., product development, sales strategies, etc.). In some embodiments, the insights can include identifying a schema associated with the data. A schema can be an organizational structure and a/or method of organization. In some embodiments, data manager 410 identifies a domain schema. A domain can be based on an industry (e.g., car industry, banking industry, etc.). In some embodiments, the domains can include automotive, real estate, construction, education, banking, and mining. In some embodiments, the insights can include identifying a category of data. A category/characteristic can describe a subset of data within a data lake—for example, a column name (e.g., name, dates, sales amount, etc.), a table name, etc.

Data crawler 411 can be any combination of hardware and/or software configured to gather and/or analyze data in data source 420. In some embodiments, crawler 411 analyzes documentation related to the data. The documentation can be related to the schema, the data collection method, naming conventions, semantic descriptions, data attributes, variables, classes of data, resource names, and the like.

In some embodiments, crawler 411 can crawl various data sources. The crawling can analyze domain data. In some embodiments, crawler 411 identifies data frames containing similar information. For example, crawler can identify two columns from two different data sources that are labeled differently (e.g., a first source lists "Sales" a second list "Revenue"). In some embodiments, crawler can link one or more data sources based on identifying similar information.

In some embodiments, the data gathered by crawler 411 can be sent to and/or used by insight engine 412. The data can be the input into the learning models of insight engine 412. In some embodiments, crawler 411 can extract a semantic meaning of the data categories within the schema.

Insight engine 412 can be any combination of hardware and/or software configured to generate/identify insights into one or more data sources. In some embodiments, the insight can include a common/domain schema among the various data sources. In some embodiments, the insight includes identified common unified features across various data sources. A common unified schema (or domain schema) can be a schema that has common factors.

In some embodiments, the insights include domain specific features. The domain specific features can be related to one or more categories and/or categorical schemas. In some embodiments, the domain specific features can be identified by analyzing the data source documentation. The domain specific features can also be identified by analyzing publicly available sources. The sources can be books, blogs, articles, and/or any other resource related to the category. In some embodiments, the insights can be features that are used across multiple data sources.

In some embodiments, insight engine 412 uses machine learning. In some embodiments, insight engine 412 includes one or more separate learning models. For example, a first model can be configured to identify a schema and/or categories associated with a data source. A second model can be configured to link the various data sources by their common attributes. Or the first model, second model and/or third model can be combined into one or more different models. Insight engine 412 can receive a series of inputs, process through one or more layers of nodes, and output a result. The result can be the one or more insights.

In some embodiments, insight engine 412 may execute machine learning on data from the environment using one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR). In some embodiments, the BBSH may execute machine learning using one or more of the following example techniques: principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), region-based convolution neural networks (RCNN), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

Sync-adapter 413 can be any combination of hardware and/or software configured to identify/generate insights from one or more data sources. In some embodiments, sync-adapter 413 includes crawler 411 and/or insight engine 412. In some embodiments, sync-adapter 413 can perform all the functions of crawler 411 and/or insight engine 412. In some embodiments, sync-adapter 413 analysis data sources to identify schemas and identify links across the various data sources. In some embodiments, sync-adapter 413 analyzes documentation related to the data sources. The analysis can extract semantic descriptions, and/or attributes of the data.

In some embodiments, sync-adapter 413 can identify a domain for the data source. The domain can be correlated to a bit category such as an industry (e.g., real estate, construction, education, etc.).

In some embodiments, sync-adapter 413 can receive input from a user. The user can review knowledge graph 415. The user can resolve conflicts generated. Resolving conflicts can include adding/removing/updating edges and/or nodes. The update can add an edge/link a relevant portion of the data (e.g., a column previously not included) into the knowledge graph. The update can indicate how the data relates to the overall schema.

Reverse insight adapter 414 can be any combination of hardware and/or software configured apply the insights of sync-adapter 413 to different data source. In some embodiments, reverse insight adapter 414 can identify a domain for a data source. For example, a detailed analysis can be performed on data source 420(1) that includes generating a number of insights, a GAFS, and determining the domain correlated to a first industry. The relevant insights and GAFS can then be applied to data source 420(2) and 420(3) that are also correlated to the first industry. Thus, the computing resources can be saved by not performing the insight analysis (e.g, sync-adapter 413) on the other data sources. In some embodiments, only features that are common to the various data sources are applied.

In some embodiments, reverse insight adapter 414 can build a new learning model for the other data sources. This can include identifying a common feature set. The user can make adjustment for features outside of the common feature set. In some embodiments, reverser insight adapter 414 generates the GAFS. In some embodiments, the GAFS can include metrics related to each feature in the GAFS. For example, the metrics can include importance of the feature, how many data sources include the feature (e.g., client coverage), and other similar factors. In some embodiments, reverse insight adapter 414 can fork/apply the GAFS to any or all data sources. It can also recommend features to include in the GAFS both globally and specifically for each data source.

Knowledge graph 415 can be a visual representation of the features of the data source. In some embodiments, knowledge graph includes one or more nodes. The nodes can represent the feature name and contains a set of attributes related to the node/feature—for example, the number of data sources that contain the related feature. Edges can be used to connect various nodes. The edge can indicate similarity between features. The edges can include a similarity score/correlation score to indicate the relative similarity between the nodes. In some embodiments, the nodes can represent a single data source. In some embodiments, the nodes from various data sources can be interconnected. In some embodiments, knowledge graph 415 includes all possible links between nodes. In some embodiments, knowledge graph 415 include GAFS. The GAFS can include the features identified as most important (e.g., highest relevance score, most common, etc.). GAFS can include additional visual indicators. The visual indicators can include graphs, descriptions, histogram, and other similar visual aids.

Data source 420 can be any combination of hardware and/or software configured to store data. In some embodiments, data source 420 is a data lake. In some embodiments, data source 420 is a database. In some embodiments, one or data source 420 (e.g., data source 420(1)) is correlated to an entity. The other data sources (e.g., data source 420(2)) can be correlated to a second entity. In some embodiments, data source 420 can include a data collector. New data can be added to each data source. In some embodiments, each data source 420 can be one subsection of a larger data storage system. For example, the larger data source can be a data center, and each data source can be the drives and storage devices allocated to an entity or sub entity (e.g., department within a bigger entity).

Figure 5:
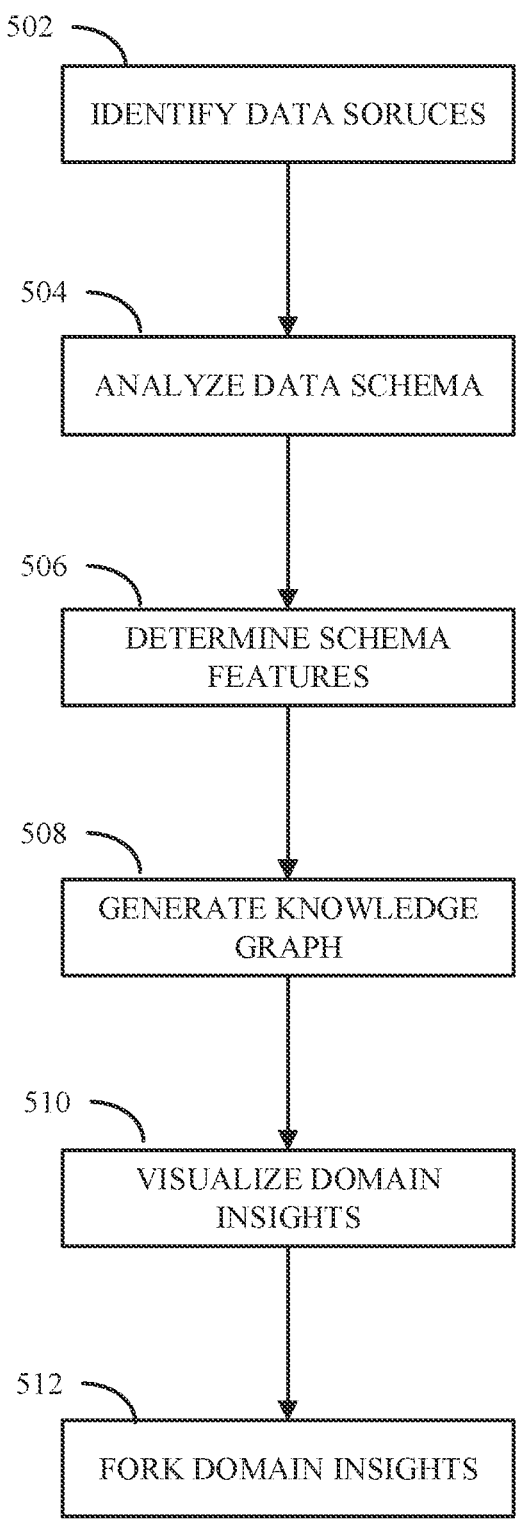
FIG. 5 is a flow chart of an example method identify insights from a domain of data pools and fork results to all the data pools according to embodiments present disclosure.

FIG. 5 is a flow chart of an example method, method 500, to identify insights in a first data source and apply those insights against one or more different data sources, according to embodiments of the present disclosure. The method 500 can be performed in a computing environment (e.g., computing environment 400 and/or cloud computing environment 50). One or more of the advantages and improvements described above for preventing interference for co-located users in a virtual environment can be realized by method 500, consistent with various embodiments of the present disclosure.

Method 500 can be implemented by one or more processors, host 405, data manager 410, crawler 411, insight engine 412 sync-adapter 413, reverse insight adapter 414, knowledge graph 415, and/or data sources 420. For illustrative purposes, the method 500 will be described as being performed by data manager 410.

At operation 502, data manager 410 identifies one or more data sources. In some embodiments, one of the data sources can be a primary data source. The primary data source can be the data source that is used to build the feature set. The results of the primary data source can then be applied to the other identified data sources.

In some embodiments, each data source can correspond to a different entity/client. In some embodiments, on or more data sources can correspond to the same client. To correspond can be managed by, and/or have the data collected/owned by the entity. In some embodiments, each data source can correspond to a category (e.g., industry, schema, etc.).

At operation 504, data manager 410 analyzes a schema associated with the data source(s). The primary data source and/or all other data sources can be analyzed. The schema can represent and organization method. In some embodiments, data manager 410 analyzed each data source identified in operation 502. In some embodiments, the analysis includes mapping the data source. The mapping can include identifying how tables and/or columns within the data source are linked. In some embodiments, the analysis can identify the relative importance of columns and/or tables in the data source. The relative importance can be based on one or more of the number of entries, the number of links to other columns, the frequency of updating, the frequency of similar columns across various data sources and other similar factors.

In some embodiments, operation 504 includes analyzing data source documentation. In some embodiments, the documentations can include any available documentation related to the data source. In some embodiments, the documentation is stored in the data source. In some embodiments, data manager 410 can utilize natural language processing (NLP) to analyze the documentation. The analysis can extract semantic descriptions and/or attributes from the documents. In some embodiments, the analysis includes crawling code bases of the data sources. The crawling can extract the same and/or similar information as the document analysis. The crawling can be performed by crawler 411

At operation 506, data manager 410 identifies schema features. In some embodiments, the schema feature can be domain specific features. A domain specific feature can be a feature that is common across a domain (e.g., an industry). For example, all data sources in the domain of medical field can have a high reliance/high weighting of column represents a frequency of patient visits. This column and its connection can be domain specific feature. In some embodiments, the schema features include a derives feature set. The derived feature set can be features identified across more than one data sources based on results of operation 504. The derived feature set can be for a single entity across multiple domains. A derived feature set can also span multiple entities across multiple domains. In some embodiments, the schema features can link across the feature and across the various data sources. In some embodiments, the link can be represented by one or more correlation score. The correlation score can represent the relative similarity between two features and/or a similar feature in two data sources.

At operation 508, data manager 410 generates a knowledge graph. In some embodiments, the knowledge graph can represent the identified schema and the various links. In some embodiments, the knowledge graph represents the primary data source. In some embodiments, the knowledge graph can represent the various data sources. In some embodiments, the knowledge graph includes nodes and edges. The node can represent the features and contain a set of attributes, and the edges can represent the links and include correlation scores.

In some embodiments, operation 508 includes resolving conflicts. In some embodiments, the conflict can be resolved by a subject matter expert (SME) (e.g., user, data owner). The SME can apply human intelligence into the knowledge graph. Resolving the conflicts can include adding, adjusting, and/or removing nodes and/or edges in the knowledge graph. In some embodiments, conflicts are resolved for each knowledge graph generated. In some embodiments, the conflicts are resolved in response to a trigger. The trigger can be a correlation score that falls above ore below a predetermined threshold—for example, if a first column has no correlation greater (or any correlation less than) 10%. In some embodiments, a conflict is resolved if a node has too many or to few links. The thresholds can be domain specific.

At operation 510, data manager 410 visualizes (e.g., generates/creates a visual display) the domain insights. In some embodiments, the visualizations include GAFS and/or are performed by the GAFS. The visualization can display one or more of feature importance, feature relevance to domain, feature dominance, and/or other similar metrics. The visualization can be based on all insights across multiple data sources. In some embodiments, operation 510 is performed by reverse insight adapter 414.

At operation 512, data manager 410 forks the domain insights to one or more specific data sources. In some embodiments, the forking can include generating GAFS for the specified data sources. The forked GAFS can be specific to the data source. In some embodiments, forking the domain insights includes generating learning model for the specified data source. The generated learning model can identify insights within the data source. This can provide additional insights into the data source from different data source in a common domain. In some embodiments, operation 512 is performed by reverse insight adapter 414.

In some embodiments, operation 512 includes a bias check. The bias check can include generating a black box model. The black box model can be based on attributes specific to the data source. The bias check can include comparing the results of the black box model and the GAFS based model. In some embodiments, the SME can validate that the GAFS model is within predetermined bias limits.

Computer Technology and Computer Readable Media

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. As another example, the steps in two or more different figures can be combined into a single process and/or co-occurring process It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
identifying a set of data sources, wherein each of the data sources is associated with a domain;
analyzing a set of documentation for each of the data sources;
extracting, based on the analyzing, a set of attributes for each data source;
determining, in response to the extracting, a data schema associated with each data source;
linking, based on the set of attributes for each data source, common features of each data schema across each data source of the set of data sources;
generating, in response to the linking the common features, a knowledge graph, wherein the knowledge graph is a visual representation of the data schema of the common features;
preparing a visual display for a set of domain insights, wherein the set of domain insights include the common features; and
forking the set of domain insights into a first data source, wherein the forking includes applying the set of domain insights to a new data source not included in the set of data sources, the forking further includes generating a machine learning model configured to apply the set of domain insights to the new data source where the new data source is the first data source.

2. The method of claim 1, further comprising:
identifying a first conflict in the knowledge graph; and
resolving the first conflict, wherein the resolving includes updating the knowledge graph.

3. The method of claim 2, wherein the first conflict is resolved by receiving an input from a subject matter expert.

4. The method of claim 1, wherein the analyzing the set of documentation includes crawling a code base for each data source.

5. The method of claim 1, wherein the extracting the set of attributes includes identifying semantic descriptions and naming conventions of each data source.

6. The method of claim 1, wherein the visualizing includes generating a global analytics feature set (GAFS).

7. The method of claim 1, wherein the forking further comprises, adjusting the machine learning model to data source specific model, and generating a data source specific GAFS for the data in a selected data source.

8. The method of claim 1, wherein the knowledge graph includes a plurality of nodes and a plurality edges, wherein each node represents a feature and contains a set of feature attributes related to the feature and each edge includes a correlation score that represents a relative similarity of the feature attributes.

9. The method of claim 1, wherein the domain is selected from the group consisting of automotive, real estate, construction, education, banking, and mining.

10. The method of claim 1, wherein each of the data sources is a data lake.

11. The method of claim 1, wherein each of the data sources is correlated to a different entity.

12. A system comprising:
a processor;
a computer-readable storage medium communicatively coupled to the processor and storing program instructions;
a set of data sources wherein each data source includes a data schema and each data source is included in a domain;
a sync-adapter wherein the sync-adapter is configured to:
crawl a code base and analyze a set of documentation for each data source;
extract semantic descriptions for the data schema; and;
identify a set of schema features common to each data source in the domain; and
a reverse insight adapter configured to:
visualize the set of schema features identified by the sync adapter using a knowledge graph, wherein the knowledge graph is a visual representation of the data schema of the set of schema features;
build a domain learning model configured to identify a set of domain insights in a new data source based on the set of schema features identified by the sync adapter; and
fork the domain learning model to each data source, wherein the forking includes applying the set of domain insights to the new data source not included in the set of data sources.

13. The system of claim 12, wherein the sync-adapter is further configured to:
identify a conflict in the set of schema features; and
receive input from a subject matter expert to resolve the conflict.

14. The system of claim 13, wherein the sync-adapter is further configured to generate the knowledge graph.

15. The system of claim 12, wherein the reverse insight adapter is further configured to generate a global analytic feature set (GAFS) based on the set of schema features.

16. The system of claim 15, wherein the reverse insight adapter is further configured to adjust the domain learning model for each data source and generate a data source specific GAFS for each data source.

17. A computer program product, the computer program product comprising a computer readable storage medium having program instructions embodied therewith, the program instructions executable by a processing unit to cause the processing unit to:
identify a set of data sources, wherein each of the data sources are associated with a domain;
analyze a set of documentation for each of the data sources;
extract, based on the analyzing, a set of attributes for each data source;
determine, in response to the extracting, a data schema associated with each data source;
link, based on the set of attributes for each data source, common features of each data schema across each data source of the set of data sources;

generate, in response to the linking of the common features, a knowledge graph, wherein the knowledge graph is a visual representation of the data schema of the common features;

prepare a visual display for a set of domain insights, wherein the set of domain insights include the common features; and fork the set of domain insights into a first data source, wherein the forking includes applying the set of domain insights to a new data source not included in the set of data sources, wherein the forking further includes generating a machine learning model configured to apply the set of domain insights to the new data source where the new data source is the first data source.

18. The computer program product of claim of claim 17, wherein the program instructions are further configured to cause the processing unit to:

generate a machine learning model configured to apply the set of domain insights to each of the data sources; and adjust the machine learning model for each data source of the set of data sources.

19. The computer program product of claim 18, wherein each of the data sources is a data lake.

\* \* \* \* \*